Sept. 6, 1927.
G. O. SQUIER ET AL
1,641,608
ELECTRICAL SIGNALING
Filed June 24, 1922
2 Sheets-Sheet 1
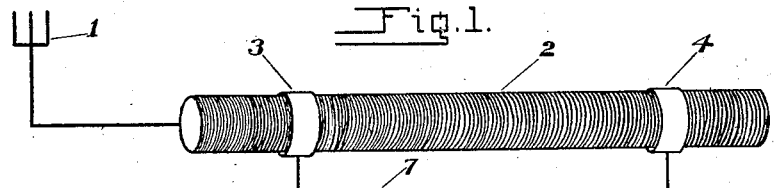
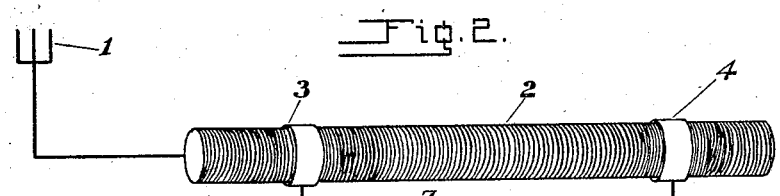
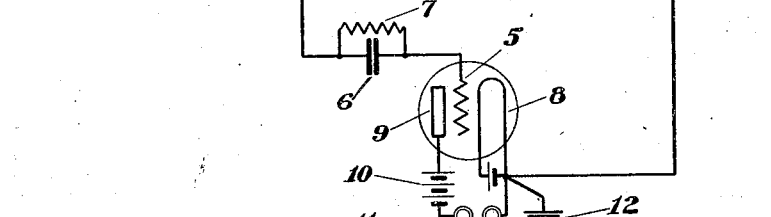
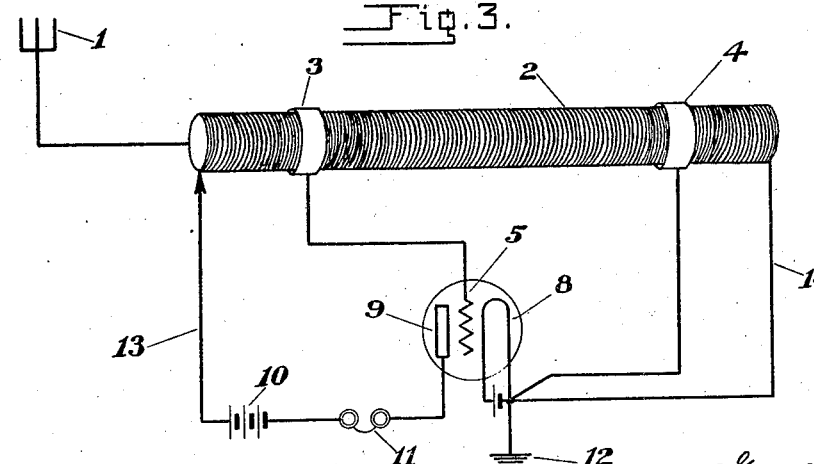
Inventor
George O. Squier
Joseph O. Mauborgne
Louis Cohen
Robert H. Young
By
Attorney Sept. 6, 1927.

G. O. SQUIER ET AL 1,641,608

ELECTRICAL SIGNALING

Filed June 24, 1922

Patented Sept. 6, 1927.

1,641,608

UNITED STATES PATENT OFFICE.

GEORGE O. SQUIER, OF WASHINGTON, DISTRICT OF COLUMBIA; JOSEPH O. MAUBORGNE, OF CHICAGO, ILLINOIS; AND LOUIS COHEN, OF WASHINGTON, DISTRICT OF COLUMBIA.

ELECTRICAL SIGNALING.

Application filed June 24, 1922. Serial No. 570,695.

This invention relates to improvements in the art of electrical signaling, particularly in the matter of receiving high frequency current signals.

The object of the present invention is an improvement in the method of and apparatus for receiving high frequency signals whether they are transmitted over lines or through space, as in the case of radio signals.

Another object of this invention is to secure greater selectivity and thereby reduce interference effects.

A still further object of the invention is to effect a simplification of the equipment required, and also facilitate the operation in the matter of "tuning in" any particular signal.

In a pending patent application, Serial Number 389,451, filed June 6, 1920, by Louis Cohen and Joseph O. Mauborgne, and patent application, Serial Number 566,442, filed June 7, 1922, by George Owen Squier, new methods and apparatus for the reception of high frequency signals transmitted over lines or through space were described. The present invention is based upon the inventions described in the applications referred to above utilizing in a general way the same methods and apparatus, but introducing new modifications which produce still further improvements in the matter of selectivity and simplification in the equipment required, and also effecting greater simplification in the operation of the receiving instruments.

The broad principles of the invention have already been described in the patent applications referred to above, in which a resonance wave coil was employed and the wave development produced on the wave coil was utilized to get the signal effects desired. In this invention we also employ a resonance wave coil, which may be used in connection with an antenna or a wire system, whether telephone, telegraph, lighting, or power, the detector being connected, electrically, to suitable points on this resonance wave coil. The method and circuit arrangements used can be better understood by reference to the accompanying diagrammatic figures which show typical embodiments of this invention, and form part of this specification.

In the accompanying drawings—

Figure 1 is a diagrammatic view of a system for carrying out our invention in which an electron tube is connected electrically to two points on the wave coil through suitable metal rings.

Figure 2 is similar to Figure 1 except that one of the rings which is operatively associated with the resonance wave coil, is grounded.

Figure 3 is a diagrammatic view of an arrangement for carrying out our invention in which a wave coil is used for tuning purposes and regeneration purposes at the same time.

Figure 4:
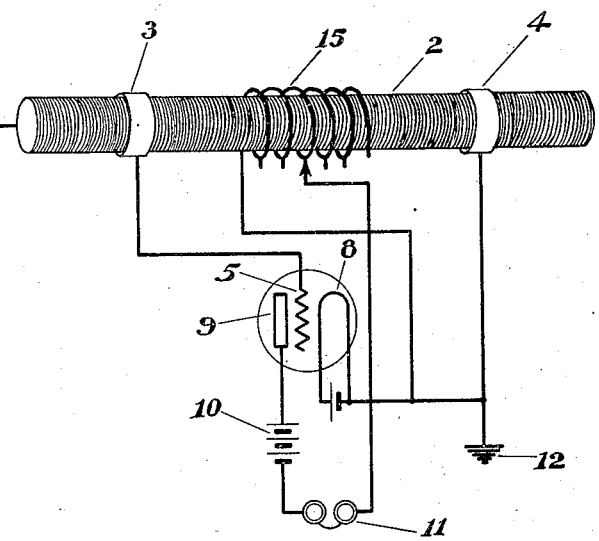

The arrangement shown in Figure 4 differs from Figure 3 in that a separate coil coupled to the wave coil is used for effecting regeneration.

Figure 5:
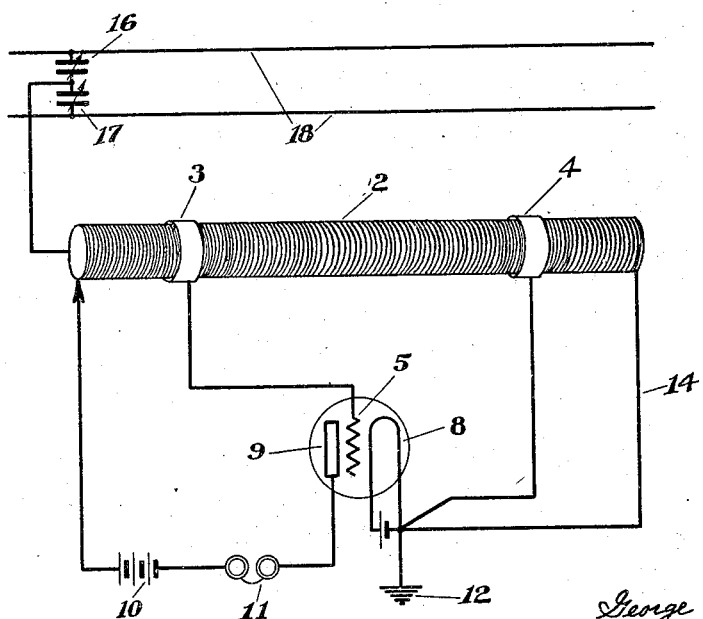

Another embodiment of our invention is shown in Figure 5 in which the resonance wave coil is connected to a wire system which may be telephone, telegraph, lighting, or power, for the purpose of picking up the signal energy which may be transmitted over such circuits.

Having more particular reference to the drawings, and in this connection with which like characters of reference will designate corresponding parts thereof, in Figure 1, the antenna 1 is connected directly to the resonance wave coil 2; 3 and 4 designate two metal rings which slide on the resonance wave coil, and are electrically insulated from the wave coil. The positions of these two rings on the coil are adjustable and may be readily shifted to different sections of the coil. One of these rings, 3, is connected to the grid 5 of an electron tube detector preferably through a condenser 6 which is shunted by a grid resistance 7, the other ring, 4, being connected to the filament 8 of the electron tube detector; 9 is the plate of the electron tube detector; 10 designates a battery, and 11 indicates suitable telephones. It may be noted here that while we prefer to use an electron tube detector because of its high sensitivity, good results may also be obtained by connecting the two rings, 3 and 4, to any other suitable high frequency detector, such as a crystal detector, for instance. The resonance wave coil may be designed to cover any reasonably desired range of wave lengths. It is merely a question of the size of the coil and the length of wire on the coil in its relation to the wave length of signals to be received. It appears that there is a definite relation between the length of wire on the coil and the wave lengths for which the coil may be used. The greater the length of wire the greater the range of wave lengths. By adjusting the positions of the rings 3 and 4 the wave coil may be brought into resonance for any particular wave length within the range of wave lengths of the particular resonance wave coil. The tuning in of a signal in this case is a very simple matter consisting merely in the simultaneous movements of the two rings or keeping one ring stationary at a predetermined position on the coil, and the adjustment effected by the movement of the other ring. In either case the operation is very simple requiring only one adjustment, and the degree of selectivity obtained by this arrangement is far superior to the selectivity obtained by the usual receiving arrangements in which lumped inductances and lumped capacities are used as tuning elements. It is to be observed that in this arrangement the standing wave development on the wave coil is utilized, the grid connection being adjusted to a loop of potential on the wave coil.

Figure 2 differs from Figure 1 in that one of the rings, specifically the one that is connected to the filament of the electron tube detector, is grounded at 12, and thus very useful in increasing the strength of the signals.

The arrangement shown in Figure 3 has the additional feature that the wave coil 2, in addition to its function as a tuning element, is also used for the purpose of effecting regeneration, and this is accomplished by connecting the wave coil 2 in the plate filament circuit through the leads 13 and 14 as shown in the figure. The plate filament circuit connection is indicated by plate 9, battery 10, telephones 11, lead 13, wave coil 2, lead 14, and filament 8. In this arrangement a variation in the intensity of the regeneration energy is accomplished by the movement of the ring 4; changing the position of ring 4 the degree of regeneration is varied. A condition can be readily obtained whereby the regeneration is sufficiently strong to produce oscillations on the wave coil and thus make it possible to utilize the method of beat reception for receiving continuous waves, telegraphic signals. For telephone reception the oscillations are of course undesirable and therefore the degree of regeneration is carried only to the point where the desired amount of amplification is obtained without actually setting up oscillations on the wave coil.

The embodiment of our invention shown in Figure 4 differs from Figure 3 only in that an independent coil 15 which is connected in the plate filament circuit is used to couple electrically the plate filament circuit to the wave coil 2 for the purpose of effecting regeneration. The degree of coupling may be varied by either varying the number of turns on the coil 15 or changing its position on the wave coil 2.

Another embodiment of our invention is shown in Figure 5 in which the signals are transmitted over a wire circuit 18 (telephone, telegraph, lighting, or power) which takes the place of the antenna in the other figures. In this case the wave coil is connected through small condensers 16, 17, to the wire circuit 18 and the tuning and detection of the signals is carried out in the same way as in the arrangements described in the previous figures. In this case the function of the small condensers is merely to prevent a short circuit of the wire circuit, also to prevent low frequency currents from passing through the radio receiving equipment.

It is obvious that certain modifications may be made in the arrangement of the circuits without departing from the spirit of the invention. In the arrangement shown in all the figures the grid of the electron tube detector is shown connected to the ring near to the antenna, while the filament is shown connected to the ring farther away from the antenna. Good results can be also obtained by reversing the connections and readjusting the positions of the rings in tuning in any particular signal, i. e., the grid of the electron tube detector being connected to the ring farther away from the antenna and the filament connected to the ring nearer the antenna.

What we claim is—

1. In a system for the reception of radio signals the combination of an antenna, a single wave coil, and an electron tube detector, the grid of said electron tube detector being electrostatically connected to one point on the wave coil, the filament of the electron tube detector being connected to another point on the said wave coil, and the whole wave coil being connected in the plate filament circuit forming part of the plate filament circuit thereby effecting regeneration, the filament being grounded.

2. In a system for the reception of radio signals, the combination of an antenna, a single wave coil, a pair of metallic rings slidably mounted on said wave coil, an electron tube detector, the grid of said detector being electrostatically connected to a point on said wave coil through one of said slide rings, the filament of said detector being electrostatically connected to another point on said wave coil through the other of said slide rings, and the whole of wave coil being connected in the plate filament circuit forming part of the plate filament circuit, the filament being grounded.

3. In a system for the reception of high frequency current signals the combination of an antenna, a wave coil, and an electron tube detector, the grid of said electron tube detector being electrostatically connected to one point on the wave coil, the filament of the electron tube detector being electrostatically connected to another point on the said wave coil, part of the wave coil being connected in the plate filament circuit forming part of the plate filament circuit thereby effecting regeneration.

In testimony whereof we affix our signatures.

GEORGE O. SQUIER.
JOSEPH O. MAUBORGNE.
LOUIS COHEN.